United States Patent
Yamaguchi et al.

(10) Patent No.: US 10,663,014 B2
(45) Date of Patent: May 26, 2020

(54) HYDRAULIC CLUTCH DEVICE

(71) Applicant: Honda Motor Co., Ltd., Tokyo (JP)

(72) Inventors: Nobutaka Yamaguchi, Saitama (JP); Kenji Niwata, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 125 days.

(21) Appl. No.: 15/869,065

(22) Filed: Jan. 12, 2018

(65) Prior Publication Data

US 2018/0209489 A1    Jul. 26, 2018

(30) Foreign Application Priority Data

Jan. 24, 2017  (JP) ................................ 2017-010763

(51) Int. Cl.
| | |
|---|---|
| *F16D 25/08* | (2006.01) |
| *F16D 25/10* | (2006.01) |
| *F16D 25/0638* | (2006.01) |
| *F16D 25/12* | (2006.01) |

(52) U.S. Cl.
CPC .......... *F16D 25/08* (2013.01); *F16D 25/0638* (2013.01); *F16D 25/082* (2013.01); *F16D 25/10* (2013.01); *F16D 25/123* (2013.01)

(58) Field of Classification Search
CPC ...... F16D 25/08; F16D 25/082; F16D 25/083; F16D 25/0638; F16D 48/02
See application file for complete search history.

(56) References Cited

U.S. PATENT DOCUMENTS

| | | | | |
|---|---|---|---|---|
| 4,227,602 A | * | 10/1980 | Ideta | ...................... F16D 25/123 |
| | | | | 192/109 F |
| 5,137,624 A | * | 8/1992 | Klotz | ...................... B01D 35/02 |
| | | | | 192/106 F |
| 5,411,123 A | * | 5/1995 | Rej | ...................... F16D 25/0638 |
| | | | | 192/106 F |
| 6,381,957 B1 | * | 5/2002 | Hori | ...................... F16D 25/0638 |
| | | | | 60/436 |

(Continued)

FOREIGN PATENT DOCUMENTS

| | | |
|---|---|---|
| CN | 102937150 | 2/2013 |
| CN | 203027079 | 6/2013 |

(Continued)

OTHER PUBLICATIONS

"Office Action of China Counterpart Application", dated Feb. 28, 2019, with English translation thereof, p. 1-p. 12.

*Primary Examiner* — Stacey A Fluhart
(74) *Attorney, Agent, or Firm* — JCIPRNET

(57) ABSTRACT

Provided is a hydraulic clutch device capable of securing sufficient performance (oil filtration performance) of a filter for cleaning oil while avoiding an increase in size of the device. The hydraulic clutch device includes an oil pump, a pressure regulating valve which pressure-regulates oil discharged by the oil pump, and a hydraulic clutch engaged by the oil pressure-regulated by the pressure regulating valve, wherein the pressure regulating valve is disposed on a downstream side in an oil flow direction of the hydraulic clutch, and a filter is disposed between a piston chamber of the hydraulic clutch and the pressure regulating valve. The filter is attached to be accommodated in an accommodating portion formed by recessing an inner surface of the piston chamber from the inside of the piston chamber.

13 Claims, 7 Drawing Sheets

(56) References Cited

U.S. PATENT DOCUMENTS

| | | |
|---|---|---|
| 6,484,856 B1 | 11/2002 | Gratzer |
| 9,163,715 B2 * | 10/2015 | Valente ............... F16H 57/0404 |
| 2009/0195398 A1 * | 8/2009 | Usukura ................. F16D 48/02 |
| | | 340/644 |

FOREIGN PATENT DOCUMENTS

| | | |
|---|---|---|
| EP | 1850036 | 10/2007 |
| JP | 2009264549 | 11/2009 |
| JP | 2011149535 | 8/2011 |

* cited by examiner

Portion B

US 10,663,014 B2

HYDRAULIC CLUTCH DEVICE

CROSS-REFERENCE TO RELATED APPLICATION

This application claims the priority benefit of Japan Application no. 2017-010763, filed on Jan. 24, 2017. The entirety of the above-mentioned patent application is hereby incorporated by reference herein and made a part of this specification.

BACKGROUND

Technical Field

The disclosure relates to a hydraulic clutch device including a pressure regulating valve which pressure-regulates oil discharged by an oil pump and a hydraulic clutch engaged by the oil pressure-regulated by the pressure regulating valve.

Description of Related Art

In a power transmission path of a vehicle or the like, a hydraulic clutch which performs switching between presence and absence of power transmission and adjusting a transmission amount of power is provided. Also, as a hydraulic control device for supplying oil (hydraulic oil) to such a hydraulic clutch, there is a known hydraulic control device (for example, refer to Japanese Patent Application Laid-Open (JP-A) No. 2011-149535) including an oil strainer for storing oil, an oil pump for drawing up oil from the oil strainer and sending it to the hydraulic clutch, a piston chamber (hydraulic chamber) for driving a piston for engaging the hydraulic clutch, and a pressure regulating valve (a linear solenoid valve) for pressure-regulating oil to a predetermined pressure (hydraulic pressure).

In a hydraulic control device described in JP-A No. 2011-149535, oil drawn up by the oil pump from the oil strainer is supplied to a piston chamber of the hydraulic piston through an oil channel on an outgoing side, then is supplied from the piston chamber to the pressure regulating valve through an oil channel on a returning side, and after being pressure-regulated to a predetermined hydraulic pressure thereat, a portion is returned to the oil strainer and the remainder is supplied for lubricating a rotation sliding portion such as a bearing and a clutch.

Meanwhile, fine foreign matter (contamination) such as fine metal powders generated by clipping or sliding of metal members or the like may be contained in an oil channel through which oil discharged by an oil pump flows. However, when such fine foreign matter is introduced into a pressure regulating valve, abnormalities such as operation failure may occur in the pressure regulating valve. Therefore, to prevent such fine foreign matter from being introduced into the pressure regulating valve, a countermeasure such as installing a filter (a cleaning member) at an appropriate position of the oil channel is required.

However, depending on a position at which the filter is installed, there are cases in which a volume of the hydraulic control device may increase or the like, which may lead to an increase in size of the structure. In addition, when sufficient space for installing a filter cannot be secured, a diameter dimension of the filter (a cross-sectional area of the flow channel of the oil passing through the filter) becomes small and there is a possibility that the filter will be unable to exhibit sufficient oil filtration performance (cleaning performance).

SUMMARY

The disclosure provides a hydraulic clutch device capable of securing sufficient performance (oil filtration performance) of a filter for cleaning oil while avoiding an increase in size of the device.

A hydraulic clutch device according to one embodiment of the disclosure includes an oil pump (7), a pressure regulating valve (8) which pressure-regulates oil discharged by the oil pump, and a hydraulic clutch (5) engaged by the oil pressure-regulated by the pressure regulating valve, wherein the hydraulic clutch includes frictional engagement elements (53 and 54) provided in a power transmission path, a pressing member (piston 57) which applies a pressing force to the frictional engagement element, and a hydraulic chamber (piston chamber 59) configured to drive the pressing member by a hydraulic pressure of the introduced oil, the pressure regulating valve is disposed on a downstream side in an oil flow direction of the hydraulic chamber, and a filter (40) is disposed between the hydraulic chamber and the pressure regulating valve.

DESCRIPTION OF THE EMBODIMENTS

Figure 1:
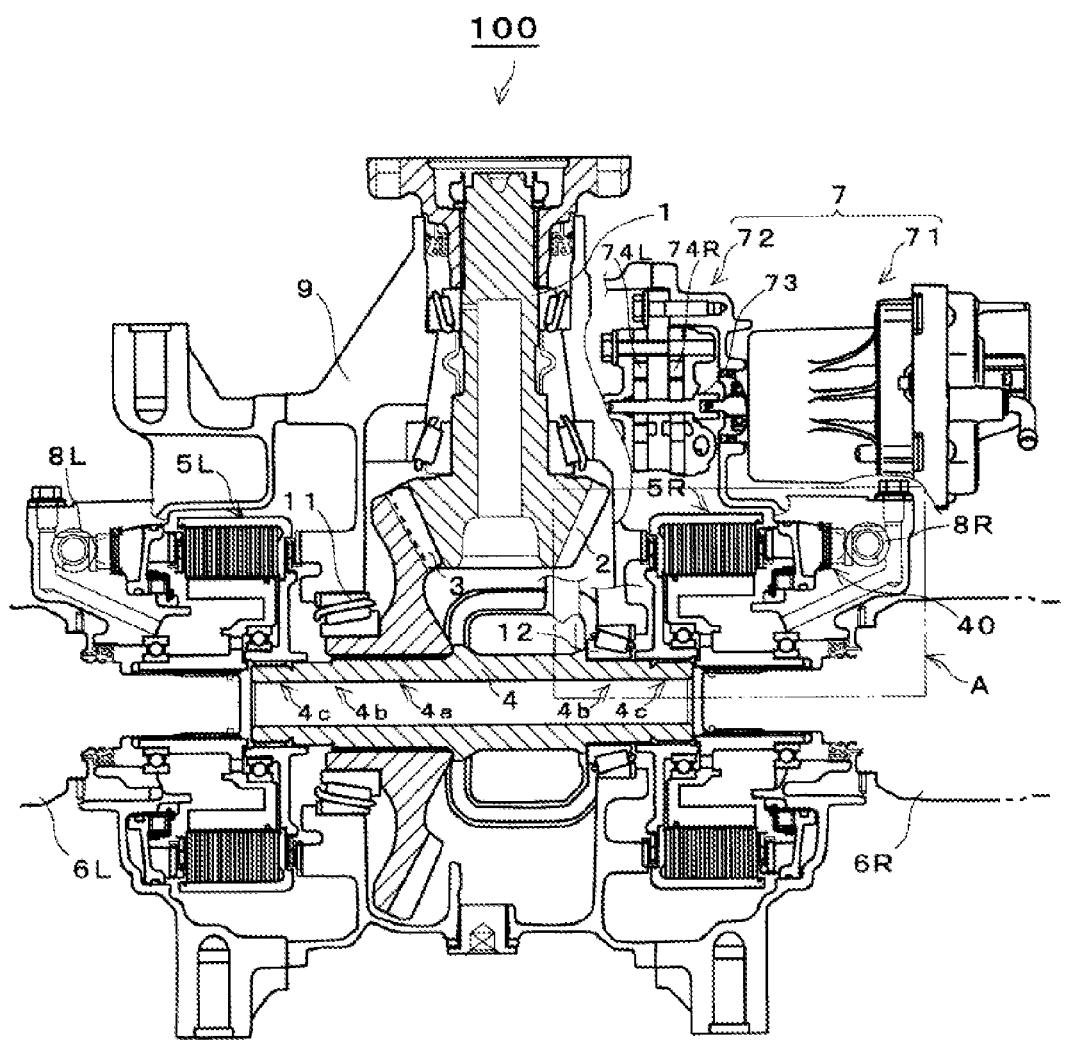
FIG. 1 is a cross-sectional view illustrating an overall configuration of a power transmission device including a hydraulic clutch device according to a first embodiment of the disclosure.

According to one embodiment, a hydraulic clutch device includes an oil pump (7), a pressure regulating valve (8) which pressure-regulates oil discharged by the oil pump, and a hydraulic clutch (5) engaged by the oil pressure-regulated by the pressure regulating valve, wherein the hydraulic clutch includes frictional engagement elements (53 and 54) provided in a power transmission path, a pressing member (piston 57) which applies a pressing force to the frictional engagement element, and a hydraulic chamber (piston chamber 59) configured to drive the pressing member by a hydraulic pressure of the introduced oil, the pressure regulating valve is disposed on a downstream side in an oil flow direction of the hydraulic chamber, and a filter (40) is disposed between the hydraulic chamber and the pressure regulating valve.

According to the hydraulic clutch device having the above-described configuration according to one embodiment, since the pressure regulating valve is disposed on the downstream side in the oil flow direction of the hydraulic clutch and the filter is disposed between the hydraulic chamber of the hydraulic clutch and the pressure regulating valve, even when fine foreign matter (contamination) is contained in the oil discharged from the hydraulic chamber of the hydraulic clutch, it is possible to remove the fine foreign matter with the filter. Therefore, it is possible to prevent fine foreign matter from being introduced into the pressure regulating valve. In addition, since the filter is disposed between the hydraulic chamber of the hydraulic clutch and the pressure regulating valve and the filter can be installed without securing a new space for the filter, it is possible to avoid an increase in size of the hydraulic control device. Further, since the filter is disposed between the hydraulic chamber of the hydraulic clutch and the pressure regulating valve, a sufficient diameter of the filter (a cross-sectional area of the oil channel of the oil passing through the filter) can be secured and sufficient oil filtration performance can be exhibited by the filter. Thereby, a hydraulic clutch device capable of securing sufficient performance (oil filtration performance) of the filter for cleaning oil while preventing an increase in size of the device is provided.

In addition, in this hydraulic clutch device, the pressure regulating valve may be disposed adjacent to the hydraulic chamber with the filter interposed therebetween. According to this configuration, an increase in volume of the hydraulic control device can be more effectively suppressed and it is possible to more reliably avoid an increase in size of the structure. Further, since it is possible to suppress a length of the oil channel between the hydraulic clutch and the pressure regulating valve to be short, a hydraulic clutch device capable of effectively reducing a pressure loss of the oil supplied to the hydraulic clutch is provided.

In addition, a hydraulic clutch device according to one embodiment includes an oil pump, a pressure regulating valve which pressure-regulates oil discharged by the oil pump, and a hydraulic clutch engaged by the oil pressure-regulated by the pressure regulating valve, wherein the hydraulic clutch includes frictional engaging elements (53 and 54) provided in a power transmission path, a pressing member which applies a pressing force to the frictional engaging elements, and a hydraulic chamber configured to drive the pressing member by a hydraulic pressure of the introduced oil, and a filter which allows oil discharged from the hydraulic chamber to pass therethrough is attached inside the hydraulic chamber.

According to the hydraulic clutch device having the above-described configuration according to one embodiment, since the filter which allows the oil discharged from the hydraulic chamber of the hydraulic clutch to pass therethrough is attached, even when fine foreign matter (contamination) is contained in the oil discharged from the hydraulic chamber of the hydraulic clutch, it is possible to remove the fine foreign matter with the filter. Therefore, it is possible to prevent fine foreign matter from being introduced into a device installed on the downstream side of the hydraulic chamber (for example, a pressure regulating valve or the like when the pressure regulating valve is provided on the downstream side of the hydraulic chamber). In addition, since the filter is installed inside the hydraulic chamber, optimization in disposing the filter and space saving can be achieved. Therefore, since the filter can be disposed without securing new space for installing the filter, it is possible to avoid an increase in size of the hydraulic control device. Further, since the filter is disposed inside the hydraulic chamber and a diameter of the filter (a cross-sectional area of the oil channel of the oil passing through the filter) can be sufficiently secured, sufficient oil filtration performance can be exhibited by the filter. Thereby, a hydraulic clutch device capable of securing sufficient performance (oil filtration performance) of the filter for cleaning oil while preventing an increase in size of the device is provided. Further, a hydraulic clutch device capable of effectively reducing a pressure loss of the oil supplied to the hydraulic clutch is provided.

In addition, in the above-described hydraulic clutch device, an accommodating portion (59a) formed by recessing an inner surface may be formed on the inner surface (59f) of the hydraulic chamber, and the filter may be attached to be accommodated in the accommodating portion from an inside of the hydraulic chamber.

According to this configuration, it is possible to install the filter with an appropriate arrangement so as not to obstruct an operation of the piston or the like in the hydraulic chamber. Further, since the filter is attached to be accommodated in the accommodating portion from the inside of the hydraulic chamber, the attachment operation of the filter can be facilitated.

In addition, in the above-described hydraulic clutch device, the filter may have a configuration in which a base portion (41) attached in the accommodating portion and a mesh-shaped filter portion (42) fixed to the base portion are integrally provided, and may include a locking member (45) for locking the base portion attached in the accommodating portion.

According to this configuration, since the locking member for locking the base portion of the filter attached in the accommodating portion is provided, the filter attached in the hydraulic chamber (inside the accommodating portion) can be prevented from being detached. Therefore, it is possible to effectively prevent operation failure in the piston or the clutch device due to detachment of the filter.

In addition, in the above-described hydraulic clutch device, an abutting portion (59g) provided on the inner surface of the hydraulic chamber and configured to come into contact with the pressing member moving in the hydraulic chamber and an attachment portion (59d) provided in the accommodating portion and configured to attach the base portion of the filter may be provided, wherein the attachment portion may be provided at a position away from a movement region (R) of the pressing member with respect to the abutting portion.

According to this configuration, since the attachment portion for attaching the base portion of the filter is provided at a position away from the movement region of the pressing member with respect to the abutting portion which comes into contact with the pressing member, it is possible to set a diameter dimension of the base portion of the filter without considering interference with the moving pressing member. Therefore, the diameter dimension of the base portion of the filter can be increased. As a result, since the cross-sectional area of the oil channel of oil passing through the filter can be enlarged, it is possible to effectively improve cleaning performance of the filter (filtration performance on oil passing through the filter).

In addition, in the above-described hydraulic clutch device, it may be configured such that oil which has passed through the filter is guided to the pressure regulating valve. Further, as a configuration for this purpose, an oil channel (67) communicating from the accommodating portion to the pressure regulating valve may be provided.

According to this configuration, since the oil discharged from the hydraulic clutch can be introduced into the pressure regulating valve in a state in which it has been filtered by the filter, it is possible to reliably prevent fine foreign matter from being introduced into the pressure regulating valve.

Therefore, it is possible to avoid occurrence of an abnormality such as operation failure or the like in the pressure regulating valve.

In addition, in the above-described hydraulic clutch device, a portion including the accommodating portion and a portion on the frictional engaging element side in the hydraulic chamber may be blocked by the pressing member installed in the hydraulic chamber.

Further, reference numerals in parentheses above indicate reference numerals of corresponding constituent elements in the embodiments to be described below for reference.

According to the hydraulic clutch device of the disclosure, it is possible to secure sufficient oil filtration performance (cleaning ability) of the filter while preventing an increase in size of the device.

Hereinafter, embodiments of the disclosure will be described with reference to the accompanying drawings.

First Embodiment

Figure 2:
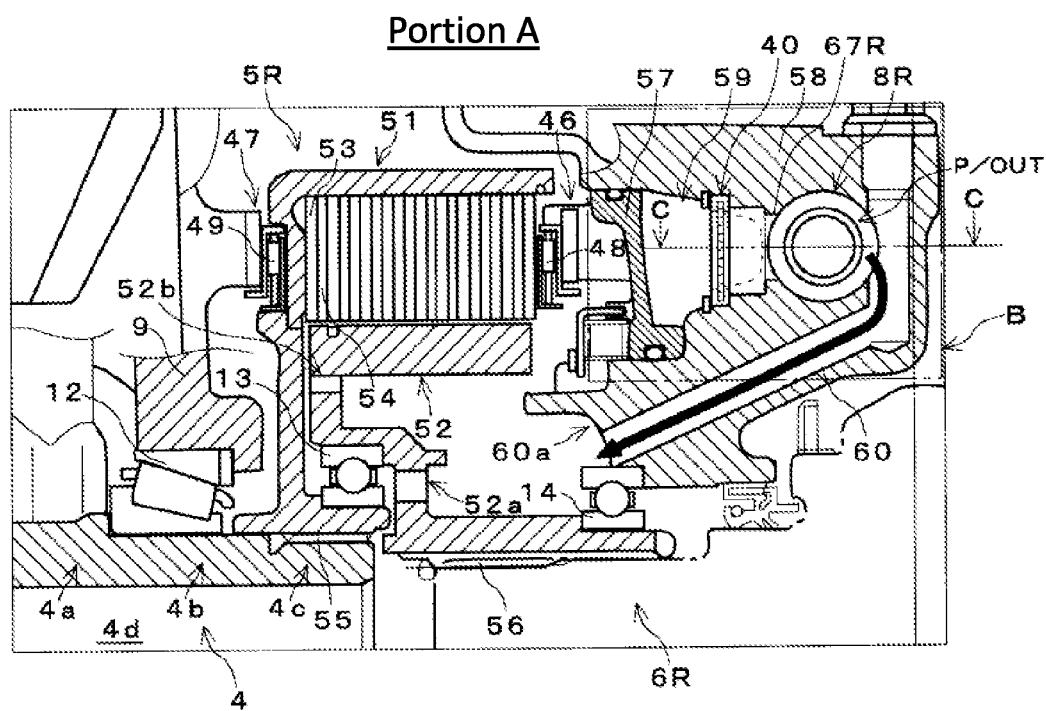
FIG. 2 is an enlarged view of portion A of FIG. 1.
Figure 3:
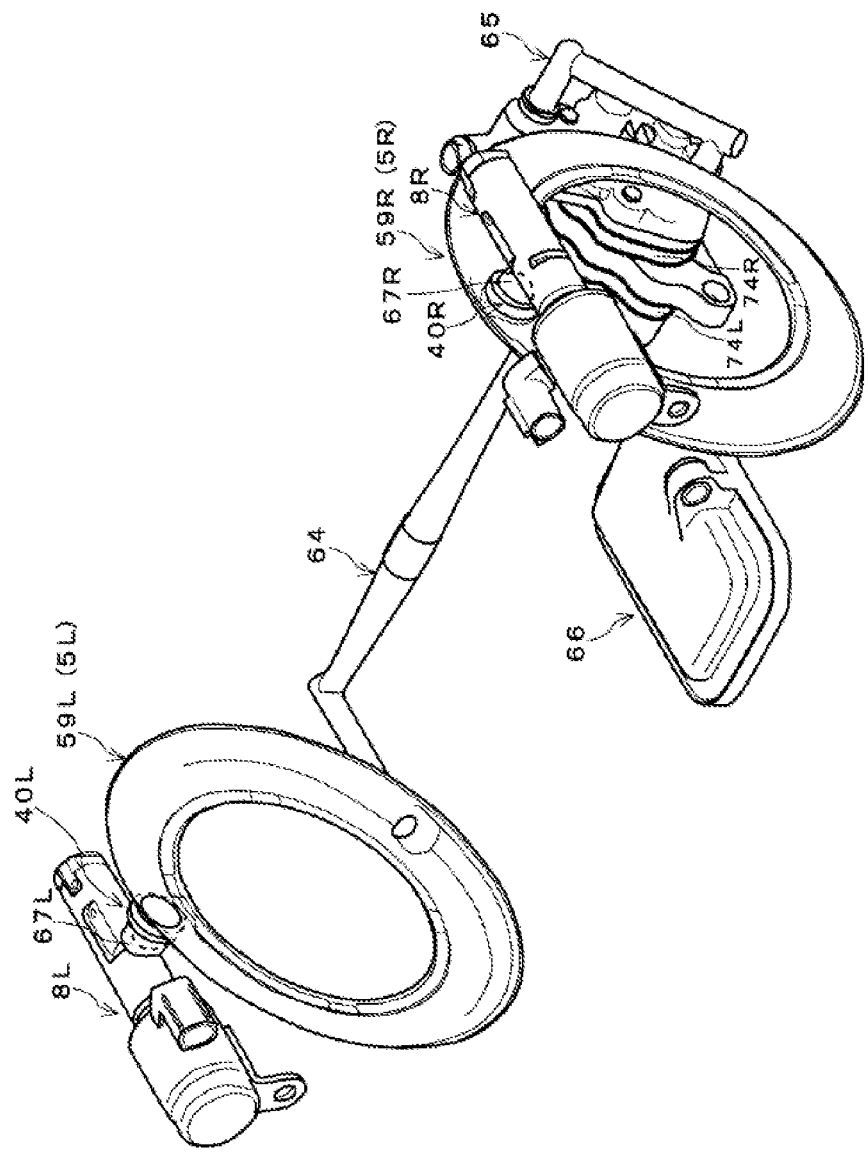
FIG. 3 is a perspective view illustrating an external configuration of a hydraulic circuit of the hydraulic clutch device.

FIG. 1 is a cross-sectional view illustrating an overall configuration of a power transmission device including a hydraulic clutch device according to a first embodiment of the disclosure. In addition, FIG. 2 is an enlarged view of portion A of FIG. 1, and FIG. 3 is a perspective view illustrating an external configuration of a hydraulic circuit of the hydraulic clutch device.

A power transmission device 100 illustrated in FIG. 1 is configured as a differential mechanism (differential mechanism) for distributing rotation of a drive shaft 1 to left and right wheels (not illustrated). The drive shaft 1 is coupled to a propeller shaft (not illustrated) and receives a driving force from a drive source (engine) (not illustrated). The hydraulic clutch device includes a drive bevel gear 2 which integrally rotates with the drive shaft 1, a driven bevel gear 3 which engages with the drive bevel gear 2, a center shaft 4 disposed to be perpendicular to the drive shaft 1 and coupled to rotate integrally with the driven bevel gear 3, left and right hydraulic clutches 5L and 5R disposed on left and right sides of the center shaft 4, left and right output shafts 6L and 6R for transmitting respective driving forces transmitted by the left and right hydraulic clutches 5L and 5R to left and right wheels (not illustrated), an oil pump (an electric oil pump) 7 which supplies hydraulic oil (oil) to each piston chamber 59 (FIG. 2) of the left and right hydraulic clutches 5L and 5R, left and right pressure regulating valves 8L and 8R for pressure-regulating oil discharged from each piston chamber 59, and a differential gear case (case) 9 which covers (accommodates) the differential mechanism. Hereinafter, each configuration will be further described.

The center shaft 4 is supported by the case 9 of the differential mechanism via tapered bearings 11 and 12. The center shaft 4 is configured to include portions which are roughly divided into a central large-diameter portion 4a, left and right middle-diameter portions 4b of the large-diameter portion 4a, and small-diameter portions 4c at left and right ends adjacent to the middle-diameter portions 4b, and the driven bevel gear 3 is fixed to the large-diameter portion 4a so that the whole of the center shaft 4 rotates integrally. A plurality of spline teeth are formed in a circumferential direction on each of the small-diameter portions 4c at the left and right ends of the center shaft 4 and are spline-coupled to integrally rotate with each clutch guide 51 (FIG. 2) of the corresponding left and right hydraulic clutches 5L and 5R.

The left and right hydraulic clutches 5L and 5R are formed of wet multi-plate clutches. Since the left and right hydraulic clutches 5L and 5R have the same configuration, only the right hydraulic clutch 5R will be described here referring to FIG. 2. For the same reason, suffixes L and R meaning "left" and "right" shall be omitted unless distinction is particularly necessary in the description below.

As illustrated in FIG. 2, a plurality of separator plates (a first friction material) 53 are arranged at predetermined intervals in an axial direction to be spline-coupled with respect to an inner circumferential surface of the clutch guide 51 which is an input side rotating member and a plurality of friction plates (a second friction material) 54 are arranged at predetermined intervals in the axial direction to be spline-coupled with respect to an outer circumferential surface of a clutch hub 52 which is an output side rotating member, and each separator plate 53 and each friction plate 54 are alternately arranged to be aligned in the axial direction to form a stacked body of the separator plates 53 and the friction plates 54. A spline portion 55 is formed at a base of the clutch guide 51, and the spline portion 55 is spline-coupled to the small-diameter portion 4c of the center shaft 4.

Similarly, a spline portion 56 is formed on a base side of the clutch hub 52. The spline portion 56 is spline-coupled to the right output shaft 6R, and the clutch hub 52 is rotatably fixed to a case 58 via a ball bearing 14 and integrally rotates with the right output shaft 6R. On the other hand, the clutch guide 51 and the clutch hub 52 are mutually supported via a ball bearing 13 and rotatable relative to each other.

The stacked body (frictional engaging portion) of the separator plates 53 and the friction plates 54 is driven in the axial direction (left direction in FIG. 2) by a piston 57 when the clutch is engaged. The separator plates 53 and the friction plates 54 are frictionally engaged with each other in accordance with driving of the piston 57, and thereby the clutch is engaged. The piston 57 is hydraulically driven by a hydraulic pressure of the piston chamber 59 and is controlled to obtain a required amount of clutch engagement at the frictional engaging portion.

A pressing portion 46 protruding in the axial direction (left direction in the drawing) is formed on a side facing the frictional engaging portion of the piston 57. The pressing portion 46 presses the frictional engaging portion. A first thrust bearing 48 which rotatably supports the frictional engaging portion in a thrust direction is attached to a distal end portion of the pressing portion 46. On the other hand, a pressing load receiving portion 47 protruding in the axial direction (right direction in the drawing) is formed at a position facing a rear side of the clutch guide 51 in the case 9. The pressing load receiving portion 47 receives a pressing load of the piston 57 applied to the frictional engaging portion. A second thrust bearing 49 which rotatably supports the clutch guide 51 in the thrust direction is attached to a distal end portion of the pressing load receiving portion 47.

The center shaft 4 corresponds to an "input shaft" for the left and right hydraulic clutches 5L and 5R, and the left and right output shafts 6L and 6R correspond to "output shafts" for the left and right hydraulic clutches 5L and 5R.

Referring to FIG. 1 again, the electric oil pump 7 is formed with a motor portion 71 generating rotational power and a pump portion 72 suctioning hydraulic oil (oil) from an oil strainer 66 (FIG. 3) by the rotational power and pressure-feeds it to the left and right hydraulic clutches 5L and 5R, and the pump portion 72 has a double-pump structure in which two left and right internal gear pumps (oil pumps) 74L and 74R are connected in series on a pump shaft 73. In this embodiment, the left internal gear pump 74L pressure-feeds oil to the piston chamber 59L of the left hydraulic clutch 5L and the right internal gear pump 74R pressure-feeds oil to the piston chamber 59R of the right hydraulic clutch 5R.

The left and right pressure regulating valves 8L and 8R are made of a linear solenoid valve (electromagnetic pressure regulating valve). As illustrated in FIG. 3, the left and right pressure regulating valves 8L and 8R in the present embodiment are substantially symmetrically disposed beside each of the piston chambers 59L and 59R of the left and right hydraulic clutches 5L and 5R. Accordingly, oil channels 67L and 67R from the left and right piston chambers 59L and 59R to the left and right pressure regulating valves 8L and 8R are formed at a shortest distance. In addition, filters (secondary filter: cleaning member) 40L and 40R for removing fine foreign matter contained in the hydraulic oil flowing through the oil channels 67L and 67R are installed in the oil channels 67L and 67R (specifically, inside a recessed portion 59a formed in the piston chamber 59 and communicating with the oil channel 67) between the piston chambers 59L and 59R and the pressure regulating valves 8L and 8R.

Figure 4A:
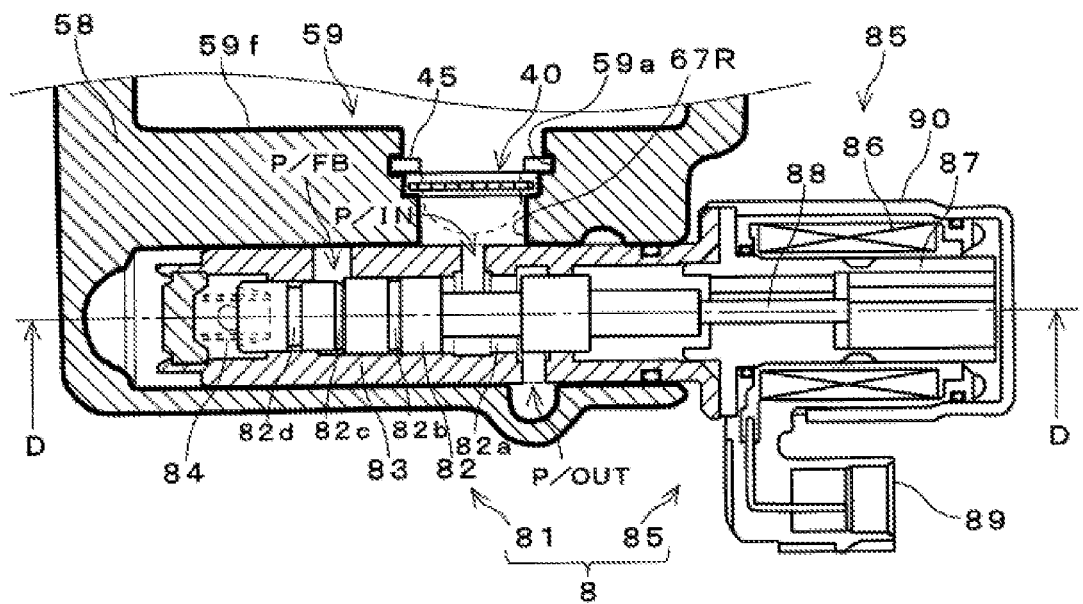
FIG. 4A and FIG. 4B are cross-sectional views of a main portion illustrating a pressure regulating valve.
Figure 4B:
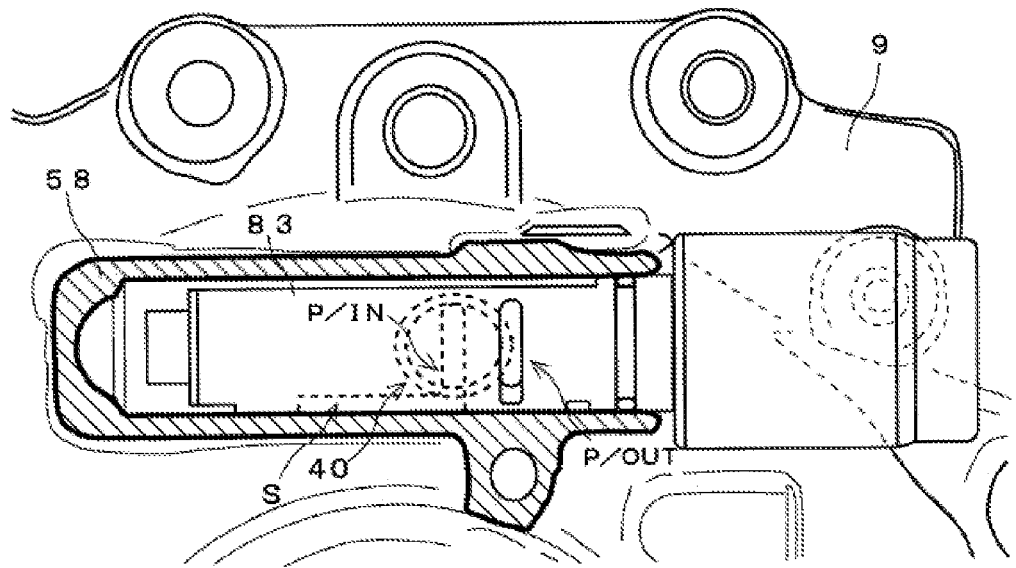

FIG. 4A and FIG. 4B are cross-sectional views of a main portion illustrating the pressure regulating valve 8R. FIG. 4A is a cross-sectional view taken along line C-C of FIG. 2, and FIG. 4B is a cross-sectional view taken along line D-D of FIG. 4A. Since constituent elements with the suffixes L and R added to reference numerals such as the left and right pressure regulating valves 8L and 8R have the same configuration that is bilaterally symmetrical, the suffixes L and R in such cases shall be omitted unless distinction is particularly necessary in the description below. As illustrated in FIG. 4A, the pressure regulating valve 8 is formed by connecting a linear solenoid 85 in series with the pressure regulating valve 81 formed with a valve body 82, a body 83 and a spring 84.

The linear solenoid 85 is formed with the coil 86 generating magnetic lines of force, a hollow cylindrical magnetic material 87 through which the magnetic lines of force generated by the coil 86 pass, a plunger 88 driven in the axial direction by action of the magnetic lines of force, a power supply portion 89 for supplying current to the coil 86, and a case 90 covering the whole structure, and the plunger 88 is joined to an end portion of the valve body 82, and the magnetic material 87 is joined to the body 83.

An inlet port P/IN, an outlet port P/OUT and a return port P/FB are formed in the body 83, and a first annular oil channel 82a, a second annular oil channel 82b, a third annular oil channel 82c, and a fourth annular oil channel 82d are formed between the valve body 82 and the body 83.

The first annular oil channel 82a communicates the inlet port P/IN with the outlet port P/OUT, whereas the second annular oil channel 82b, the third annular oil channel 82c, and the fourth annular oil channel 82d are annular oil channels through which oil discharged from the piston chamber 59 acts on the valve body 82 as a feedback pressure. As illustrated in FIG. 4B, a clearance S is partially formed between the piston case 58 and the body 83, and it is configured such that the oil discharged from the piston chamber 59 is introduced into the return port P/FB through the clearance S and acts on the valve body 82 as a feedback pressure.

Accordingly, the oil introduced from the piston chamber 59 of the hydraulic clutch 5 into the inlet port P/IN of the pressure regulating valve 8 through a filter 80 is pressure-regulated by a hydraulic pressure obtained by a combination of three forces of feedback pressure (hydraulic pressure) of the oil discharged from the piston chamber 59, thrust of the plunger 88 of the linear solenoid 85, and an elastic force acting on the valve body by the spring 84, and is discharged downstream from the outlet port P/OUT of the pressure regulating valve 8.

Further, as illustrated in FIG. 4A, the pressure regulating valve 8 is disposed adjacent to the piston chamber 59, that is, disposed to be immediately adjacent to the piston chamber 59. As described above, since the oil channel from the piston chamber 59 to the inlet port P/IN of the pressure regulating valve 8 can be connected at a shortest distance by disposing the pressure regulating valve 8 adjacent to the piston chamber 59, it is possible to suppress a pressure loss in the oil channel 67 from the piston chamber 59 to the pressure regulating valve 8 to a minimum. Further, as will be described below, it is possible to introduce the oil discharged from the outlet port P/OUT of the pressure regulating valve 8 into an inside of the hydraulic clutch 5 without it passing through an axial core oil channel formed inside the shaft.

Returning to FIG. 2, a lubricating oil channel 60 is formed inside the case 58 for guiding the oil discharged from the outlet port P/OUT of the pressure regulating valve 8 directly to the inside of the hydraulic clutch 5. That is, in the hydraulic clutch device of the present embodiment, the oil discharged from the outlet port P/OUT of the pressure regulating valve 8 is directly introduced into the inside of the hydraulic clutch 5 via the lubricating oil channel 60 without passing through the oil channel (axial core oil channel) formed inside the shaft, the introduced oil is agitated by rotation of the clutch hub 52, and thereby the rotation sliding portions such as the ball bearings 13 and 14 are lubricated. Therefore, in order to efficiently and evenly distribute the oil introduced into the hydraulic clutch 5 through the lubricating oil channel 60 to the ball bearings 13 and 14, a first through hole 52a is provided in a portion of the clutch hub 52 that faces the ball bearing 13. Further, in order to efficiently and evenly distribute the oil to the separator plates 53 and the friction plates 54, a second through hole 52b penetrating an inner circumferential surface and outer circumferential surface in a radial direction of the clutch hub 52 is provided.

Figure 5:
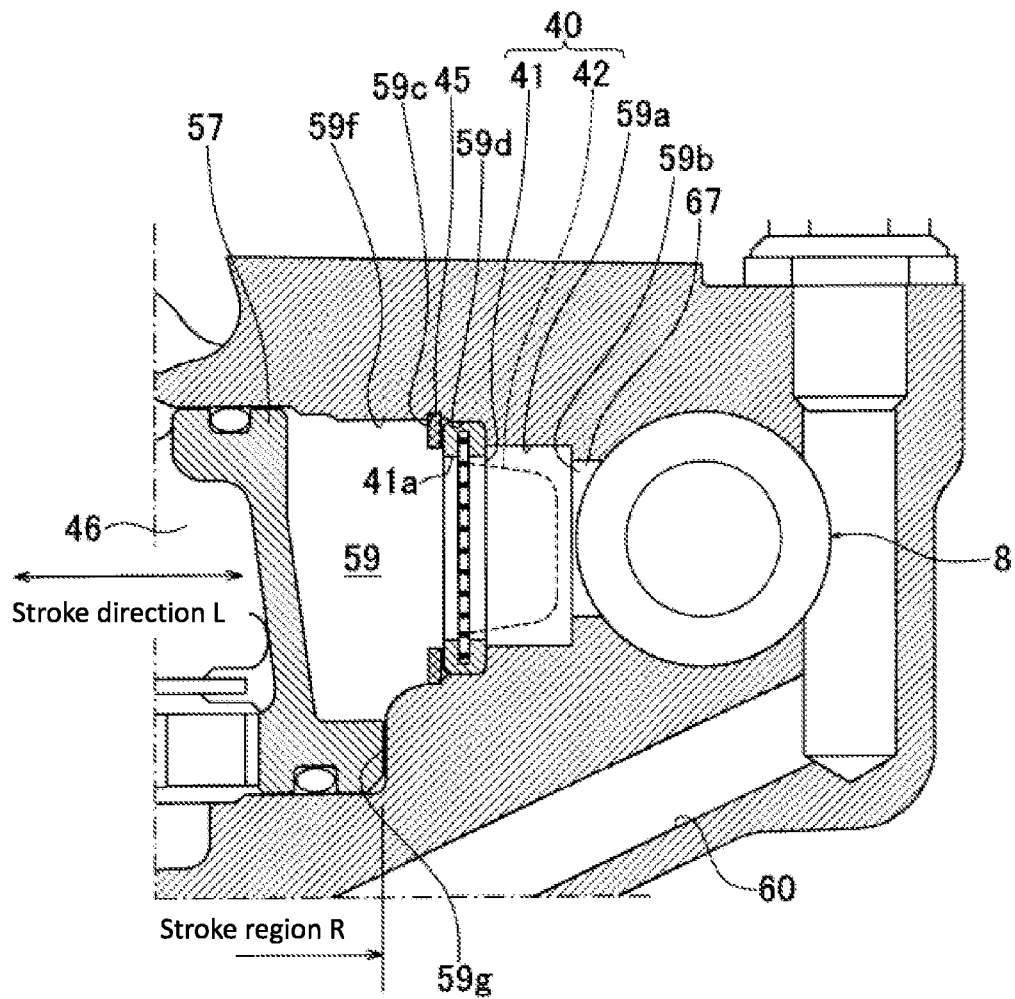
FIG. 5 is an enlarged view of portion B of FIG. 2.

Here, a filter 40 installed between the piston chamber 59 and the pressure regulating valve 8 will be described. FIG. 5 is an enlarged view of portion B of FIG. 2 for describing a detailed configuration of the filter 40 and its peripheries. As illustrated in FIG. 5, the recessed portion (accommodating portion) 59a formed of a substantially circular recess is formed on an inner wall (outer side wall in the axial direction of the center shaft 4) of the piston chamber 59. An opening 59b connected to the oil channel 67 communicating with the pressure regulating valve 8 is formed on a bottom of the recessed portion 59a. Therefore, the piston chamber 59 communicates with the pressure regulating valve 8 via the recessed portion 59a, the opening 59b, and the oil channel 67.

Also, the filter 40 is attached in the recessed portion 59a. The filter 40 has a configuration in which a circular annular base portion 41 having a circular opening 41a in the center and a mesh-shaped (mesh-shaped) bag-shaped portion (filter portion) 42 attached to protrude to one surface (a surface on the pressure regulating valve 8 side in the drawing) of the base portion 41 are integrally provided. The bag-shaped portion 42 is formed of a bottomed bag-shaped cloth material or the like attached to close the opening 41a of the base portion 41. This cloth material has a mesh shape in which a large number of minute holes are formed and is configured such that fine foreign matter (contamination) contained in the hydraulic oil can be captured inside the back shape without passing therethrough while the hydraulic oil (fluid) is allowed to pass therethrough.

The filter 40 is formed in such a dimension that an outer circumference of the base portion 41 is exactly fitted to an inner circumference of a stepped attachment portion 59d provided at an entrance of the recessed portion 59a. The attachment portion 59d is a portion formed as an annular step portion in which a diameter dimension on the back side of the recessed portion 59 is set to be smaller than that on the front side. Therefore, in the filter 40, the base portion 41 is attached to the attachment portion 59d by being fitted from the piston chamber 59 side, and in this state, a circlip (a locking member) 45 that comes into contact with the other surface (the surface on the piston chamber 59 side in the drawing) of the base portion 41 is attached. The circlip 45 is a substantially C-shaped member or the like made of an elastic metal and is attached to an annular locking groove 59c provided at a position adjacent to the attachment portion 59d by being fitted from an inner diameter side. Thereby, the base portion 41 of the filter 40 is fixed to the attachment portion 59d so as not to be detached therefrom. In this state, the bag-shaped portion 42 of the filter 40 is disposed in the recessed portion 59a, which is a state in which the bag-shaped portion 42 is disposed in a cross section of the oil flow channel communicating from the recessed portion 59a to the pressure regulating valve 8 through the oil channel 67.

In addition, as illustrated in FIG. 5, an abutting portion 59g with which the piston 57 stroked (moved) in the piston chamber 59 comes into contact is formed on an inner surface 59f of the piston chamber 59. The abutting portion 59g is a vertical wall extending in a direction (vertical direction in the drawing) substantially perpendicular to a stroke direction (a movement direction) L (lateral direction in the drawing) of the piston 57, and is configured to come into contact with an end portion of the inside in the radial direction of the piston 57 to stop it at a position at which the piston 57 is moved fully to a side opposite to the separator plates 53 and the friction plates 54 (frictional engaging elements) in the stroke direction L. Also, the attachment portion 59d to which the base portion 41 of the filter 40 is attached is provided at a position away from a region (movement region) R of the piston 57 with respect to the abutting portion 59g. That is, the attachment portion 59d is provided at a position opposite to the stroke region R of the piston 57 in the stroke direction of the piston 57 with respect to the abutting portion 59g.

In addition, as illustrated in FIG. 5, a space between a portion including the recessed portion 59a in the piston chamber 59 (a portion on the right side of the piston 57 in the drawing) and a portion (a portion on the left side of the piston 57 in the drawing) on the side of the separator plates 53 and the friction plates 54 (frictional engaging elements) is blocked by the piston 57 installed in the piston chamber 59 (the space between them is partitioned).

Figure 6:
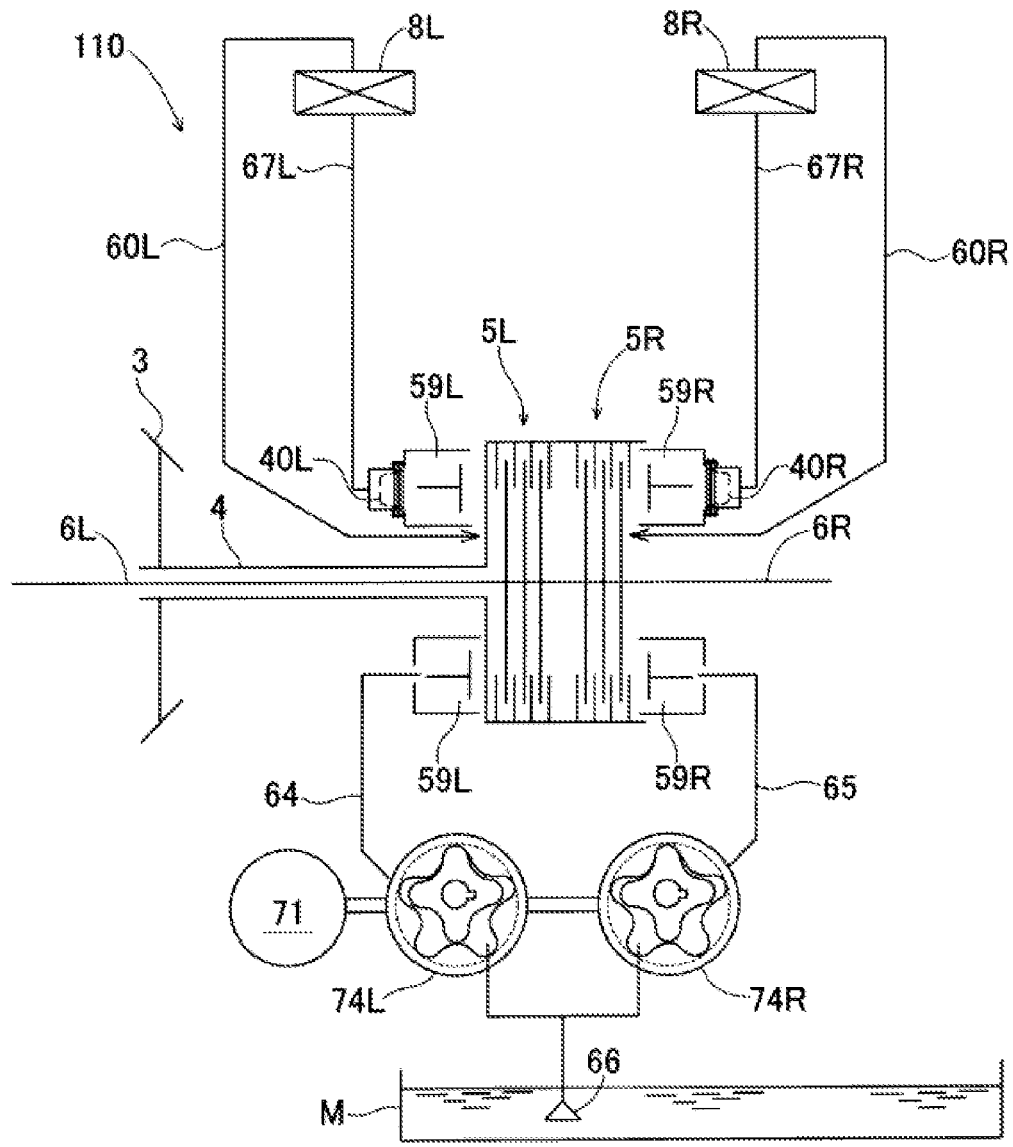
FIG. 6 is a hydraulic circuit diagram illustrating a hydraulic circuit of left and right hydraulic clutches.

FIG. 6 is a hydraulic circuit diagram illustrating a hydraulic circuit 110 of the left and right hydraulic clutches 5L and 5R. As illustrated in FIG. 6, oil channels 64 and 65 extending downstream from the left and right oil pumps 74L and 74R which draw up oil from the oil strainer 66 installed in an oil reservoir M are connected to the left and right piston chambers 59L and 59R of the left and right hydraulic clutches (clutch devices) 5L and 5R, and right and left filters 40L and 40R are respectively installed in the oil channels 67L and 67R connected from the left and right piston chambers 59L and 59R to the left and right pressure regulating valves 8L and 8R. That is, the left and right pressure regulating valves 8L and 8R are disposed on a downstream side in an oil flow direction of each of the left and right hydraulic clutches 5L and 5R, and the filters 40L and 40R are respectively disposed between the piston chambers 59L and 59R of the left and right hydraulic clutches 5L and 5R and the left and right pressure regulating valves 8L and 8R. Further, the lubricating oil channels 60L and 60R extending from the left and right pressure regulating valves 8L and 8R are configured to supply hydraulic oil (lubricating oil) to the inside of the hydraulic clutches 5L and 5R.

The oil pumps 74L and 74R discharge oil by driving of the motor portion 71, however, when the left and right pressure regulating valves 8L and 8R are in an open state, the oil discharged by the left and right oil pumps 74L and 74R bypasses the left and right piston chambers 59L and 59R. Therefore, the left and right hydraulic clutches 5L and 5R do not engage. On the other hand, when the left and right pressure regulating valves 8L and 8R are closed to a predetermined degree of opening, hydraulic pressures of the left and right piston chambers 59L and 59R positioned upstream thereof rise, and thereby the left and right hydraulic clutches 5L and 5R are engaged with a predetermined engaging force to transmit a driving force to the left and right output shafts 6L and 6R.

In the hydraulic clutch device of the present embodiment, since the pressure regulating valve 8 is disposed on the downstream side in the oil flow direction of the hydraulic clutch 5 and the filter 40 is disposed between the piston chamber 59 of the hydraulic clutch 5 and the pressure regulating valve 8, even when fine foreign matter (contamination) is contained in the oil discharged from the piston chamber 59 of the hydraulic clutch 5, it is possible to remove the fine foreign matter with the filter 40. Therefore, it is possible to prevent fine foreign matter from being introduced into the pressure regulating valve 8. In addition, since the filter 40 is disposed between the piston chamber 59 of the hydraulic clutch 5 and the pressure regulating valve 8 and thus the filter 40 can be installed without securing new space for the filter 40, it is possible to avoid an increase in size of the hydraulic clutch device. Further, since the filter 40 is disposed between the piston chamber 59 of the hydraulic clutch 5 and the pressure regulating valve 8, a diameter of the filter 40 (a cross-sectional area of the oil channel of the oil passing through the filter 40) can be sufficiently secured and sufficient oil filtration performance can be exhibited by the filter 40. Thereby, a hydraulic clutch device capable of securing sufficient performance (oil filtration performance) of the filter 40 for cleaning oil while preventing an increase in size of the device is provided.

In addition, since the pressure regulating valve 8 is disposed adjacent to the piston chamber 59 with the filter 40 interposed therebetween, an increase in volume of the hydraulic clutch device can be more effectively suppressed and it is possible to more reliably avoid an increase in size of the structure.

In addition, in the hydraulic clutch device of the present embodiment, a filter 40 that allows the oil discharged from the piston chamber to pass therethrough is attached in the piston chamber 59 of the hydraulic clutch 5. With this configuration, optimization in disposing the filter 40 and space saving can be achieved. Therefore, since the filter 40 can be disposed without securing a new space for installing the filter 40, it is possible to avoid an increase in size of the hydraulic clutch device. Further, since the filter 40 is disposed in the piston chamber 59 and a diameter of the filter 40 (a cross-sectional area of the oil channel of the oil passing through the filter 40) can be sufficiently secured, sufficient oil filtration performance can be exhibited by the filter 40. Thereby, a hydraulic clutch device capable of securing sufficient performance of the filter (oil filtration performance) for cleaning oil while preventing an increase in size of the device is provided. In addition, the hydraulic clutch device can effectively reduce a pressure loss of the oil supplied to the hydraulic clutch 5.

In addition, in the present embodiment, since a recessed portion (accommodating portion) 59a formed by recessing the inner surface 59f is formed on the inner surface 59f of the piston chamber 59 and the filter 40 is attached to be accommodated in the recessed portion 59a from the inside of the piston chamber 59, it is possible to install the filter 40 with an appropriate arrangement so as not to obstruct an operation of the piston 57 or the like in the piston chamber 59. Further, since the filter 40 is attached to be accommodated in the recessed portion 59a from the inside of the piston chamber 59, the attachment operation of the filter 40 can be facilitated.

In addition, in the present embodiment, since the circlip (locking member) 45 for locking the base portion 41 of the filter 40 attached in the recessed portion 59a is provided, the filter 40 attached in the piston chamber 59 (inside the recessed portion 59a) can be prevented from being detached therefrom. Therefore, it is possible to effectively prevent operation failure in the piston 57 or the hydraulic clutch 5 due to detachment of the filter 40.

Further, in the present embodiment, the oil channel 67 communicating from the recessed portion 59a formed in the inner surface 59f of the piston chamber 59 to the pressure regulating valve 8 is provided. Thereby, it is configured such that oil leaving the piston chamber 59 of the hydraulic clutch 5 and passing through the filter 40 is guided to the pressure regulating valve 8. According to this configuration, since the oil can be introduced into the pressure regulating valve 8 in a state in which it has been filtered by the filter 40, it is possible to reliably prevent fine foreign matter from being introduced into the pressure regulating valve 8. Therefore, it is possible to avoid occurrence of an abnormality such as operation failure or the like in the pressure regulating valve 8.

Further, in the present embodiment, the abutting portion 59g provided on the inner surface 59f of the piston chamber 59 and configured to come into contact with the piston 57 striking in the piston chamber 59, and the attachment portion 59d provided at the entrance of the recessed portion 59a for attaching the base portion 41 of the filter 40 are provided. Also, the attachment portion 59d is provided at a position away from the stroke region R of the piston 57 with respect to the abutting portion 59g.

According to this configuration, since the attachment portion 59d for attaching the base portion 41 of the filter 40 is provided at a position away from the stroke region R of the piston 57 with respect to the abutting portion 59g with which the piston 57 comes into contact, it is possible to set a diameter dimension of the base portion 41 of the filter 40 without considering interference with the striking piston 57. Therefore, the diameter dimension of the base portion 41 of the filter 40 can be increased. As a result, since the cross-sectional area of the oil channel of oil passing through the filter 40 can be enlarged, it is possible to effectively improve cleaning performance (filtration performance on oil passing through the filter) of the filter 40.

Second Embodiment

Next, a second embodiment of the disclosure will be described. In the description of the second embodiment and the corresponding drawings, the same reference numerals are given to the same or corresponding components as those of the first embodiment, and a detailed description thereof will be omitted below. In addition, matters other than matters to be described below and matters other than those illustrated are the same as in the first embodiment. This also applies to the other embodiments described below.

Figure 7:
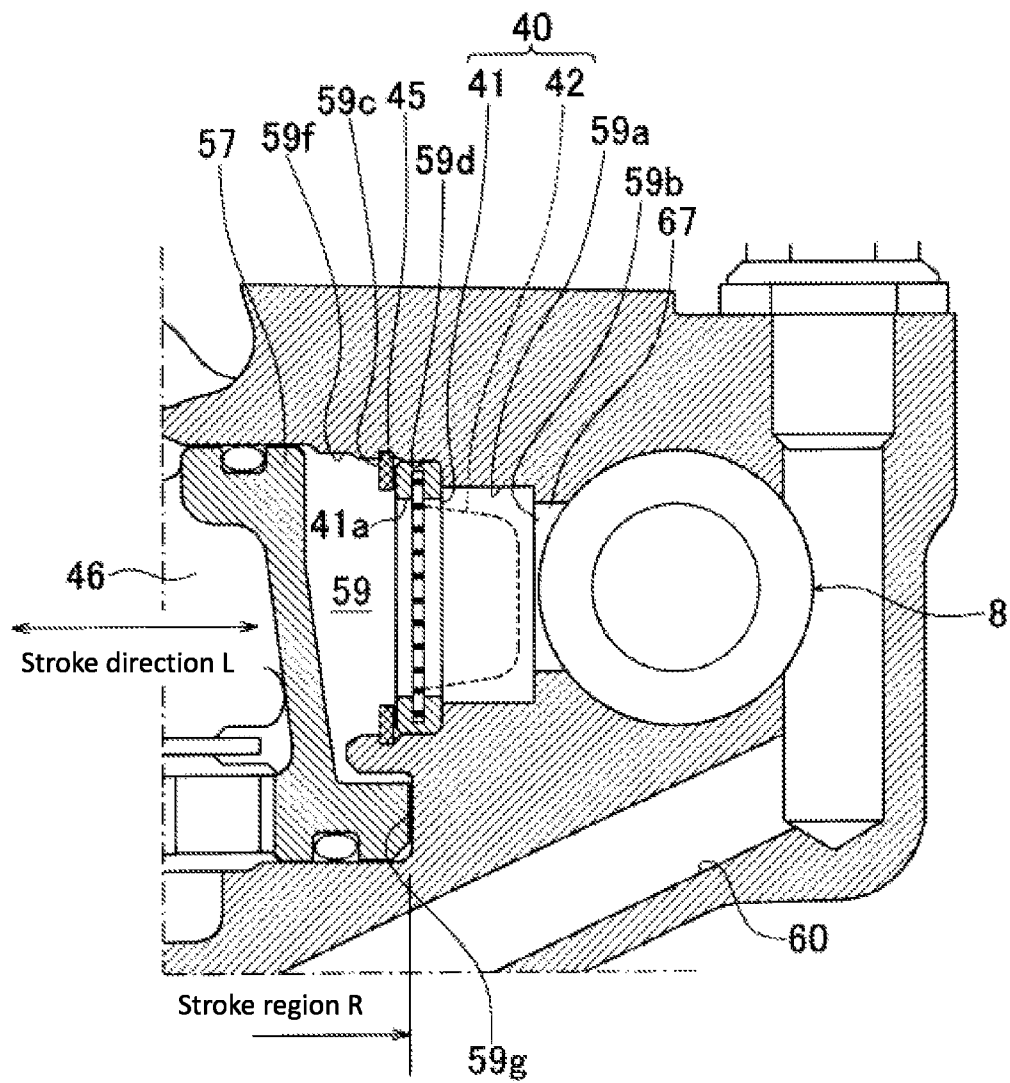
FIG. 7 is a view illustrating a configuration of a piston chamber and a filter according to a second embodiment.

FIG. 7 is a view illustrating a configuration of a piston chamber and a filter included in a hydraulic clutch device according to the second embodiment of the disclosure, and illustrates a portion corresponding to FIG. 5 of the first embodiment. In the hydraulic clutch device of the first embodiment, the attachment portion 59d for attaching the base portion 41 of the filter 40 is provided at a position away from the movement region (stroke region) R of the piston 57 with respect to the abutting portion 59g, whereas, in a hydraulic clutch device of the present embodiment, an attachment portion 59d for attaching a base portion 41 of a filter 40 is provided at substantially the same position as an abutting portion 59g in a stroke direction L (lateral direction in the drawing) of a piston 57. The base portion 41 of the filter 40 attached to the attachment portion 59d is disposed on an outer side (on a side away from a center) of the abutting portion 59g in a radial direction of the piston 57. In addition, the attachment portion 59d is provided at a position overlapping at least a part of the stroke region R of the piston 57 in the stroke direction L (lateral direction in the drawing) of the piston 57.

In the present embodiment, with the configuration as described above, it is possible to dispose the filter 40 closer to the piston 57 and frictional engaging elements 53 and 54 (right side in the drawing). Along with this, a pressure regulating valve 8 can also be disposed close to the same side. Thereby, it is possible to minimize an external dimension of the device including the piston chamber 59, the filter 40 and the pressure regulating valve 8. In addition, it is possible to suppress an amount of protrusion of the pressure regulating valve 8 from a case 58 (an amount of protrusion toward the outside in the stroke direction L (lateral direction in the drawing) of the piston 57) to be small. Thereby, it is possible to reduce an external dimension of the hydraulic clutch device. In addition, it is possible to increase a degree of freedom of parts layout in device design.

Although embodiments of the disclosure have been described above, the disclosure is not limited to the above-described embodiments, and various modifications can be made within the scope of the claims and the technical ideas described in the specification and the drawings.

What is claimed is:
1. A hydraulic clutch device comprising:
an oil pump;
a pressure regulating valve which pressure-regulates oil discharged by the oil pump; and
a hydraulic clutch engaged by the oil pressure-regulated by the pressure regulating valve, wherein
the hydraulic clutch includes:
frictional engaging elements provided in a power transmission path;
a pressing member which applies a pressing force to the frictional engaging elements; and
a hydraulic chamber configured to drive the pressing member by a hydraulic pressure of the introduced oil,
the pressure regulating valve is disposed on a downstream side in an oil flow direction of the hydraulic chamber, and
a filter is disposed between the pressing member at the hydraulic chamber and the pressure regulating valve.

2. A hydraulic clutch device comprising:
an oil pump;
a pressure regulating valve which pressure-regulates oil discharged by the oil pump; and
a hydraulic clutch engaged by the oil pressure-regulated by the pressure regulating valve, wherein
the hydraulic clutch includes:
frictional engaging elements provided in a power transmission path;
a pressing member which applies a pressing force to the frictional engaging elements; and
a hydraulic chamber configured to drive the pressing member by a hydraulic pressure of the introduced oil,
an accommodating portion formed by recessing an inner surface is formed on the inner surface of the hydraulic chamber; and
a filter which allows oil discharged from the hydraulic chamber to pass therethrough is attached in the hydraulic chamber to be accommodated in the accommodating portion from an inside of the hydraulic chamber.

3. The hydraulic clutch device according to claim 2, wherein the filter has a configuration in which a base portion attached in the accommodating portion and a mesh-shaped filter portion fixed to the base portion are integrally provided, and includes a locking member for locking the base portion attached in the accommodating portion.

4. The hydraulic clutch device according to claim 3, further comprising:
an abutting portion provided on the inner surface of the hydraulic chamber and configured to come into contact with the pressing member moving in the hydraulic chamber; and
an attachment portion provided in the accommodating portion and configured that the base portion of the filter is attached to the attachment portion, wherein
the attachment portion is provided at a position away from a movement region of the pressing member with respect to the abutting portion.

5. The hydraulic clutch device according to claim 4, wherein:
an oil channel communicating from the accommodating portion to the pressure regulating valve is provided; and
oil which has passed through the filter is guided to the pressure regulating valve through the oil channel.

6. The hydraulic clutch device according to claim 5, wherein a portion of the hydraulic chamber including the accommodating portion and a portion of the hydraulic chamber on a side of the frictional engaging element are blocked by the pressing member installed in the hydraulic chamber.

7. The hydraulic clutch device according to claim 4, wherein a portion of the hydraulic chamber including the accommodating portion and a portion of the hydraulic chamber on a side of the frictional engaging element are blocked by the pressing member installed in the hydraulic chamber.

8. The hydraulic clutch device according to claim 3, wherein:
an oil channel communicating from the accommodating portion to the pressure regulating valve is provided; and
oil which has passed through the filter is guided to the pressure regulating valve through the oil channel.

9. The hydraulic clutch device according to claim 8, wherein a portion of the hydraulic chamber including the accommodating portion and a portion of the hydraulic chamber on a side of the frictional engaging element are blocked by the pressing member installed in the hydraulic chamber.

10. The hydraulic clutch device according to claim 3, wherein a portion of the hydraulic chamber including the accommodating portion and a portion of the hydraulic chamber on a side of the frictional engaging element are blocked by the pressing member installed in the hydraulic chamber.

11. The hydraulic clutch device according to claim 2, wherein:
an oil channel communicating from the accommodating portion to the pressure regulating valve is provided; and
oil which has passed through the filter is guided to the pressure regulating valve through the oil channel.

12. The hydraulic clutch device according to claim 11, wherein a portion of the hydraulic chamber including the accommodating portion and a portion of the hydraulic chamber on a side of the frictional engaging element are blocked by the pressing member installed in the hydraulic chamber.

13. The hydraulic clutch device according to claim 2, wherein a portion of the hydraulic chamber including the accommodating portion and a portion of the hydraulic chamber on a side of the frictional engaging element are blocked by the pressing member installed in the hydraulic chamber.

* * * * *